US008805852B2

(12) United States Patent
Gopal et al.

(10) Patent No.: US 8,805,852 B2
(45) Date of Patent: Aug. 12, 2014

(54) AUTOMATIC QUERY EXECUTION PLAN MANAGEMENT AND PERFORMANCE STABILIZATION FOR WORKLOADS

(75) Inventors: S. Venkatesh Gopal, Overland Park, KS (US); Bryan Frederick Smith, Austin, TX (US); Torsten Steinbach, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 12/395,836

(22) Filed: Mar. 2, 2009

(65) Prior Publication Data
US 2010/0223253 A1    Sep. 2, 2010

(51) Int. Cl.
    *G06F 17/30* (2006.01)
(52) U.S. Cl.
    USPC ......................................... 707/748
(58) Field of Classification Search
    USPC ................................. 707/718, 748
    See application file for complete search history.

(56) References Cited

U.S. PATENT DOCUMENTS

| | | | |
|---|---|---|---|
| 5,940,819 A | 8/1999 | Beavin et al. | |
| 6,006,220 A | 12/1999 | Haderle et al. | |
| 6,219,660 B1 | 4/2001 | Haderle et al. | |
| 6,985,904 B1 | 1/2006 | Kaluskar et al. | |
| 7,080,062 B1 | 7/2006 | Leung et al. | |
| 7,275,051 B2 | 9/2007 | Hrle | |
| 7,552,110 B2 | 6/2009 | Hrle et al. | |
| 2004/0019587 A1 | 1/2004 | Fuh et al. | |
| 2004/0039729 A1 | 2/2004 | Boger et al. | |
| 2004/0181521 A1* | 9/2004 | Simmen ........................... | 707/3 |
| 2004/0243555 A1* | 12/2004 | Bolsius et al. ..................... | 707/3 |
| 2005/0065921 A1 | 3/2005 | Hrle et al. | |
| 2005/0091196 A1 | 4/2005 | Day et al. | |
| 2005/0097091 A1 | 5/2005 | Ramacher et al. | |
| 2005/0177557 A1 | 8/2005 | Ziauddin et al. | |
| 2006/0074874 A1 | 4/2006 | Day et al. | |
| 2006/0106839 A1 | 5/2006 | Shen et al. | |
| 2006/0129542 A1* | 6/2006 | Hinshaw et al. .................. | 707/3 |
| 2006/0212428 A1 | 9/2006 | Nelson | |
| 2007/0271218 A1* | 11/2007 | Lim et al. .......................... | 707/2 |
| 2008/0104014 A1 | 5/2008 | Burger et al. | |

(Continued)

OTHER PUBLICATIONS

Sonali Surange, Increase productivity in Java database development with new IBM pureQuery tools, Part 1: Overview of pureQuery tools, Sep. 6, 2007.*

(Continued)

*Primary Examiner* — Ajay Bhatia
*Assistant Examiner* — Kurt Mueller
(74) *Attorney, Agent, or Firm* — Kunzler Law Group, PC

(57) ABSTRACT

A method, apparatus, and computer program product are disclosed for managing query execution plans for a workload. In one embodiment, the method includes gathering an initial set of performance characteristics generated from a database management system (DBMS) executing a database workload according to one or more query execution plans (QEPs). The database workload includes one or more database statements. The method determines a QEP change for one or more QEPs of the database workload. In addition, the method gathers a subsequent set of performance characteristics generated from the DBMS executing the one or more QEPs of the database workload influenced by the QEP change. Furthermore, the method determines a performance difference created by the QEP change based on the initial set of performance characteristics and the subsequent set of performance characteristics and responds to the performance difference in accordance with a monitoring policy.

25 Claims, 7 Drawing Sheets

(56) References Cited

U.S. PATENT DOCUMENTS

| | | | |
|---|---|---|---|
| 2008/0133458 A1* | 6/2008 | Zabback et al. | 707/2 |
| 2008/0222093 A1* | 9/2008 | Fan et al. | 707/2 |
| 2009/0030888 A1* | 1/2009 | Sahu et al. | 707/5 |
| 2009/0049012 A1* | 2/2009 | Bossman et al. | 707/3 |
| 2009/0327214 A1* | 12/2009 | Richardson et al. | 707/2 |
| 2010/0114868 A1* | 5/2010 | Beavin et al. | 707/718 |
| 2010/0198808 A1* | 8/2010 | Graefe et al. | 707/713 |

OTHER PUBLICATIONS

Sonali Surange and Becky Nin, Increase productivity in Java database development with new IBM pureQuery tools, Part 2: Detect and fix SQL problems inside Java program, Sep. 20, 2007.*

Jens Lundgren. Optimizing persistent data handling using IBM pureQuery. Diss. Technical University of Denmark, DTU, DK-2800 Kgs. Lyngby, Denmark, Oct. 2, 2010.* http://www.orafaq.com/wiki/Oracle_database_Performance_Tuning_FAQ <retrieved on Oct 25, 2008>, See section: "My query was fine last week and now it is slow. Why?".

Purcell et al., "Insurance for Your Access Paths Across Rebinds", Intelligent Optimizer, www.idug.org , pp. 37-39, available from as early as Nov. 20, 2007.

Zhu et al. "Building Multistates Cost Models for Dynamic Multidatabase Enivronments." , Jul. 2008.

* cited by examiner

AUTOMATIC QUERY EXECUTION PLAN MANAGEMENT AND PERFORMANCE STABILIZATION FOR WORKLOADS

BACKGROUND OF THE INVENTION

1. Field of the Invention

This invention relates to query execution plans and more particularly relates to managing query execution plans for a workload.

2. Description of the Related Art

A database administrator ("DBA") is often concerned with groups of database statements rather than single individual database statements. These groups of database statements are referred to as database workloads. The DBA is often concerned with maximizing the execution performance of certain workloads and must ensure that the execution of the workload by the Database management system ("DBMS") obtains a certain level of performance. A DBA is typically interested in the query execution plans ("QEP"s) created by the DBMS for database statements in the workload.

DBMSs such as DB2, Oracle, IMS, and MYSQL often create query execution plans ("QEP"s) to optimize the execution of database queries. A QEP identifies a set of indexes, tables, caches, and other optimization aides that the DBMS references each time it executes a database query associated with the QEP. A QEP associated with a request may change based upon the information that the DBMS has about the data such as statistics, other physical schema changes, or updated code of the optimizer. Usually, these changes result in a more efficient QEP and greater performance. However, sometimes the database query performs worse under the new QEP.

The time and effort required to manage QEPs increases greatly when a DBA is monitoring one or more workloads. Some DBMSs allow the DBA to provide "hints" that guide the DBMS in QEP creation for statements in the workload. However, relying on the DBA to provide hints requires expertise by the DBA to understand how to influence the QEP creation. In addition, hints cannot always be used to get the exact QEP desired. Moreover, creating and maintaining hints are time-consuming tasks especially at the workload level.

SUMMARY OF THE INVENTION

The present invention has been developed to provide for managing query execution plans for a workload.

A method is presented for gathering an initial set of performance characteristics, determining a QEP change for one or more QEPs, gathering a subsequent set of performance characteristics, determining a performance difference created by the QEP change, and responding to the performance difference.

In one embodiment, the method includes gathering an initial set of performance characteristics generated from a database management system (DBMS) executing a database workload according to one or more query execution plans (QEPs). The database workload includes one or more database statements. The method determines a QEP change for one or more QEPs of the database workload.

In addition, the method gathers a subsequent set of performance characteristics generated from the DBMS execute the one or more QEPs of the database workload influenced by the QEP change. Furthermore, the method determines a performance difference created by the QEP change based on the initial set of performance characteristics and the subsequent set of performance characteristics. The method also responds to the performance difference in accordance with a monitoring policy.

In one embodiment, the method includes defining a set of database statements comprising the database workload. In another embodiment, defining includes receiving one or more user identified database statements from a user and defining the set of database statements of the database workload based on the one or more user identified database statements. In one embodiment, defining includes monitoring an application, a session, and an Internet Protocol ("IP") address for one or more associated database statements and defining the set of database statements of the database workload based on the one or more associated database statements.

In another embodiment, the method includes storing one or more of the initial set of performance characteristics, the subsequent set of performance characteristics, QEP change, the performance difference, and the one or more QEPs of the database workload influenced by the QEP change in a repository. In one embodiment, responding includes signaling the DBMS to revert to a workload QEP baseline in response to the performance difference exceeding a threshold. Furthermore, responding may also include applying a hint to the DBMS to modify the one or more QEPs of the database workload influenced by the QEP change. The method may include receiving the hint from the user.

In some embodiments, the method includes presenting a user with two or more versions of a particular QEP through a user interface. The particular QEP is a QEP changed by the QEP change and the user interface indicates differences between the versions of the particular QEP. In addition, gathering one or more of the initial set of performance characteristics and the subsequent set of performance characteristics may include gathering database table column statistics, database table index statistics, execution time, client side execution time, server side execution time, and a system snapshot.

An apparatus is presented for automatic query execution plan and performance stabilization for workloads. The apparatus may include an initial monitoring module, a change determination module, a subsequent monitoring module, a performance determination module, and a responding module. In certain embodiments, the apparatus may also include a workload definition module, a storage module, a reversion module, and a user interface module. In addition, the responding module may include a hint module and the workload definition module may include a statement monitoring module. The preceding modules may be configured to functionally perform the necessary steps as described above in relation to the method. In addition, in certain embodiments, the hint is related to a particular database statement of the database workload. In this embodiment, the apparatus includes a propagation module that propagates the hint to an additional DBMS. The additional DBMS executes the particular database statement.

Moreover, in another embodiment, the responding module includes a notification module that generates a notification in response to the performance difference exceeding a threshold.

A computer program product is also presented for automatic query execution plan and performance stabilization for workloads. The computer program product may include executing a database workload according to one or more QEPs. The computer program product may also include gathering an initial set of performance characteristics generated from executing the database workload according to the one or more QEPs and performing a QEP change for one or more QEPs of the database workload.

The computer program product may execute the one or more QEPs of the database workload influenced by the QEP change. In addition, the computer program product may gather a subsequent set of performance characteristics generated from executing the one or more QEPs of the database workload influenced by the QEP change. The computer program product may also determine a performance difference created by the QEP change based on the initial set of performance characteristics and the subsequent set of performance characteristics and respond to the performance difference in accordance with a monitoring policy.

In one embodiment, responding includes reverting to a workload QEP baseline in response to the performance difference exceeding a threshold. In addition, responding may include receiving a hint to modify the one or more QEPs of the database workload influenced by the QEP change.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
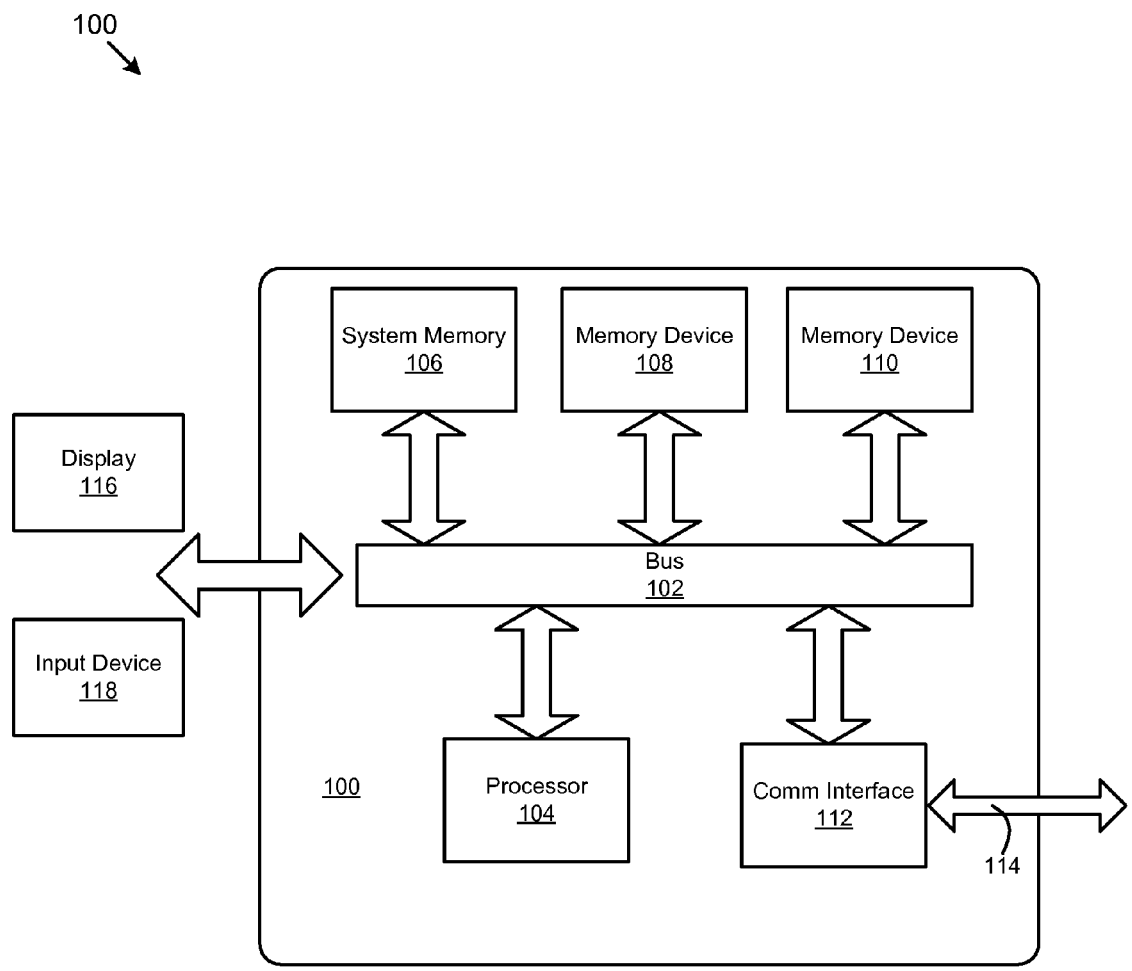
FIG. 1 is a schematic block diagram illustrating an exemplary system of hardware components capable of implementing embodiments of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of hardware embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium maybe, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating an exemplary system 100 of hardware components capable of implementing embodiments of the present invention. The system 100 may include various systems and subsystems. The system 100 may be a personal computer, a laptop computer, a workstation, a computer system, an appliance, an application-specific integrated circuit ("ASIC"), a Personal Digital Assistant ("PDA"), a digital music player, a server, a server blade center, a server farm, a router, a switch, an appliance, a motor, an automotive system, an avionics system, or the like. One of skill in the art will recognize other examples of electronic devices that may serve as the system 100.

The system 100 includes a system bus 102, a processor 104, a system memory 106, one or more memory devices 108,110, a communication interface 112, a communication link 114, a display 116, and an input device 118.

The system bus 102 is in communication with a processor 104 and a system memory 106. At least one additional memory 108, 110, such as a hard disk drive, server, stand alone database, or other non-volatile memory, may also be in communication with the bus 102. The bus 102 operably interconnects the processor 104, the memory devices 106-110, the communication interface 112, the display 116, and the input device 118. In some embodiments, the bus 102 also operably interconnects one or more additional ports. The ports may allow for connections with other resources or peripherals, such as printers, digital cameras, scanners, wireless devices, and the like.

The processor 104 is a computing device well-known to those in the art and may include an application-specific integrated circuit ("ASIC"). The processor 104 executes a set of instructions to implement the operations of embodiments of the present invention.

The additional memory devices 106, 108, 110 may be configured to store data, programs, instructions, database queries in text or compiled form, and any other information that may be needed to operate a processor or computer. The memories 106, 108, 110 may comprise computer-readable media (integrated or removable) such as a memory card, disk drive, compact disk (CD), or server accessible over a network. In certain embodiments, the memories 106, 108, 110 may comprise text, images, video, and/or audio, portions of which may be available in different human languages, such as English, French, Spanish, and the like.

Additionally, the memory devices 108, 110 may also serve as databases or datastores for a relational database management system (DBMS). Alternatively, the system 100 may be configured to access an external DBMS through the communication interface 112, which may be in communication with the system bus 102, and communication link 114.

The display 116 may be digital or analog. In some embodiments, the display may be a cathode ray tube ("CRT"), a liquid crystal display ("LCD"), a plasma display panel ("PDP"), a light emitting diode or series thereof ("LED"), or the like. Alternatively, or in addition, the display module 208 may include an audio speaker for providing audio information.

The input device 118 is an input device for interacting with a user. In some embodiments, the input device 118 comprises a keyboard, mouse, microphone, telephone, or another system or electronic device. The input device 118 may also accept output from the bus 102 in some embodiments.

In operation, system 100 may be used to implement a DBMS that provides results in response to a plurality of database queries. The DBMS may receive the database queries in accordance with various query database protocols including SQL, XQUERY, and the like, hereinafter referred to as database statements. Computer executable logic for implementing the DBMS resides on one or more of the system memory 106, and the memory devices 108, 110 in accordance with certain embodiments of the present invention. The processor 104 executes one or more instructions originating from one or more of the system memory 106, and the memory devices 108, 110. The term "computer readable medium" as used herein refers to a medium that participates in providing instructions to processor 104 for execution.

Figure 2:
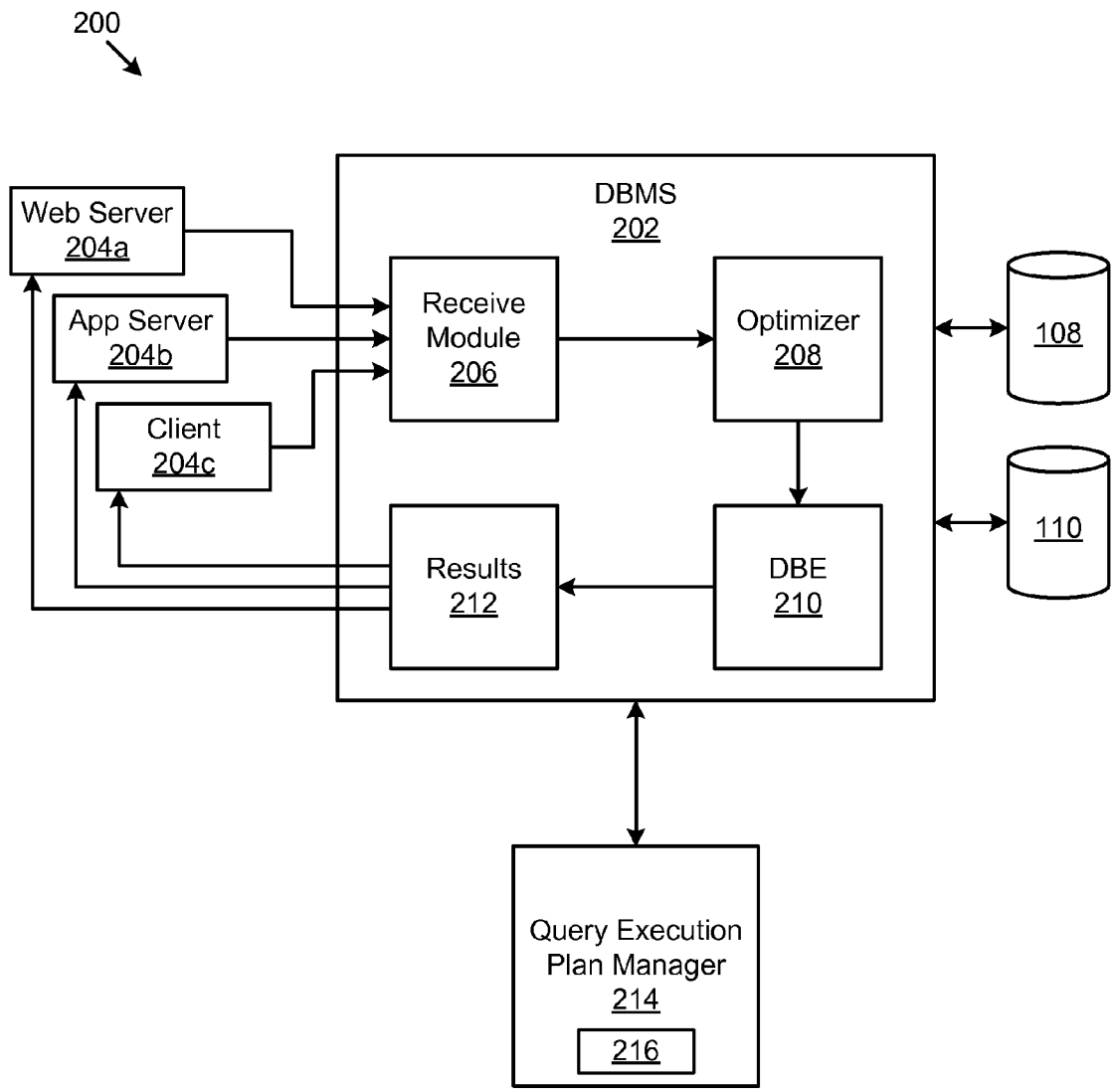
FIG. 2 is a schematic block diagram illustrating one embodiment of a system for automatic query execution plan and performance stabilization for workloads in accordance with the present invention.

FIG. 2 is a schematic block diagram illustrating one embodiment of a system 200 for automatic query execution plan and performance stabilization for workloads in accordance with the present invention. The system 200 includes a DBMS 202 in communication with one or more datastores 108, 110 and one or more clients 204a-c in communication with the DBMS 202. The system 200 also includes a Query Execution Plan Manager 214 in communication with the DBMS 202. The Query Execution Plan Manager 214 monitors and manages a database workload 216.

The DBMS 202 communicates with the clients 204a-c, datastores 108, 110, and Query Execution Plan Manager 214 using various local or remote communications links such as wired and wireless network, communication busses and the like. The communication links implement various protocols including TCP/IP, Fibre Channel, and the like.

The DBMS 202, also referred to as a database server, responds to database queries from clients such as a web server 204a, an application server 204b, or a client 204c configured to issue database requests in accordance with industry accepted formats and protocols. To provide optimal performance, the DBMS 202 includes a variety of optimization components and aides for handling static and dynamic database queries.

The term "static database queries" as used herein refers to database queries that do not change between two subsequent requests for the same information. In other words, while the data values associated with query predicates may change between subsequent requests, the predicates and the fields of data requested do not change.

The term "dynamic database queries" as used herein refers to database queries that do change between two subsequent requests for the same information. In other words, both the data values associated with query predicates may change between subsequent requests, and the predicates and the fields of data requested may also change.

The DBMS 202 includes a receive module 206 and a database engine (DBE) 210. The receive module 206 and the database engine 210 cooperate to provide the basic functionality of the DBMS 202. The receive module 206 accepts database queries from the clients 204a-c. The receive module 206 parses the database queries and provides a query execution plan (QEP), or access plan, to the DBE 210 for fulfilling the request. The database queries may be in computer executable format such as computer object code, script code, interpretive code, or the like. The QEP typically includes references to one or more query fulfillment aides such as indexes, caches, and the like. The DBE 210 follows the instructions to retrieve the requested data from the datastores or memory 108, 110.

The datastores 108, 110 comprise one or more data storage devices configured to hold data in an organized manner that facilitates prompt retrieval, and are substantially described above in relation to FIG. 1.

The DBE 210 provides the results to a results module 212. The results module 212 packages the result data into a format compatible with the format requested by the client 204 and send the results to the client 204.

To increase the efficiency and minimize the response time of the DBMS 202, the DBMS 202 includes an optimizer 208. The optimizer 208 cooperates with the receive module 206 to provide the most optimal set of retrieval instructions to the DBE 210 as possible. The optimizer 218 performs such functions as identifying that a database query is a static database query or a dynamic database query, mapping and/or hashing of static database queries and dynamic database query requests to corresponding QEPs based on QEP bindings, generating new QEP that use various indexes, and other optimization tools of the DBMS 202.

The DBMS 202 associates a database statement with a QEP to improve execution performance of the database statement. Furthermore, a DBMS 202 may change the QEP associated with a particular statement. Often, the new QEP will result in a performance improvement, but not always. If performance declines, it is difficult for the user or database administrator ("DBA") to revert back to the QEP in use before the change.

The Query Execution Plan Manager 214 continuously monitors a database workload 216 in a database system. As used herein, a database workload 216 is a set of database statements that are to be monitored. The statements in the database workload 216 may be critical database statements that the DBA needs to ensure meet certain performance criteria. The statements in the database workload 216 may originate from a common application or group of applications, may be all database statements originating from a particular Internet Protocol ("IP") address, or may originate from a particular user session and the like.

The Query Execution Plan Manager 214 stores, in a repository, the QEPs associated with the monitored workload 216 and performance characteristics of execution of the workload 216. The Query Execution Plan Manager 214 gives a DBA greater control over the performance of a database workload 216 by allowing the DBA to view performance characteristics before and after QEP changes and see specific changes in the QEPs for the workload 216. Using the Query Execution Plan Manager 214, a DBA may establish a performance baseline for the workload 216 and see changes when the workload 216 performance or QEPs within the workload 216 vary from the baseline.

The Query Execution Plan Manager 214 may automatically revert to one or more archived QEPs in the workload 216 or may guide the DBA to revert to one or more archived QEPs in the workload 216 by using hints. As used herein, a hint is a directive that allows a DBA to override the QEP that the optimizer would normally use. Examples include a DBA instructing the DBMS 202 to use a different join order, use of a different join method, to use a different access path for a table and to use a table scan instead of an index scan or an index scan instead of a table scan. The Query Execution Plan Manager 214 may suggest certain hints to the DBA, apply hints from existing QEPs, or guide the DBA to create a new hint.

The Query Execution Plan Manager 214 may be implemented on a system similar to the system 100 illustrated in FIG. 1. Furthermore, as illustrated in FIG. 2, in one embodiment, the Query Execution Plan Manager 214 is implemented on a computing device separate from the DBMS 202. In another embodiment, the Query Execution Plan Manager 214 is implemented within the DBMS 202. In a further embodiment, the workload 216 monitoring portion of the Query Execution Plan Manager 214 is implemented in a separate computing device from one or more other QEP managing tools including the user interface and hint generation tool as will be explained hereafter. One of ordinary skill in the art realizes that the Query Execution Plan Manager 214 may be implemented with various combinations of hardware and software.

Figure 3:
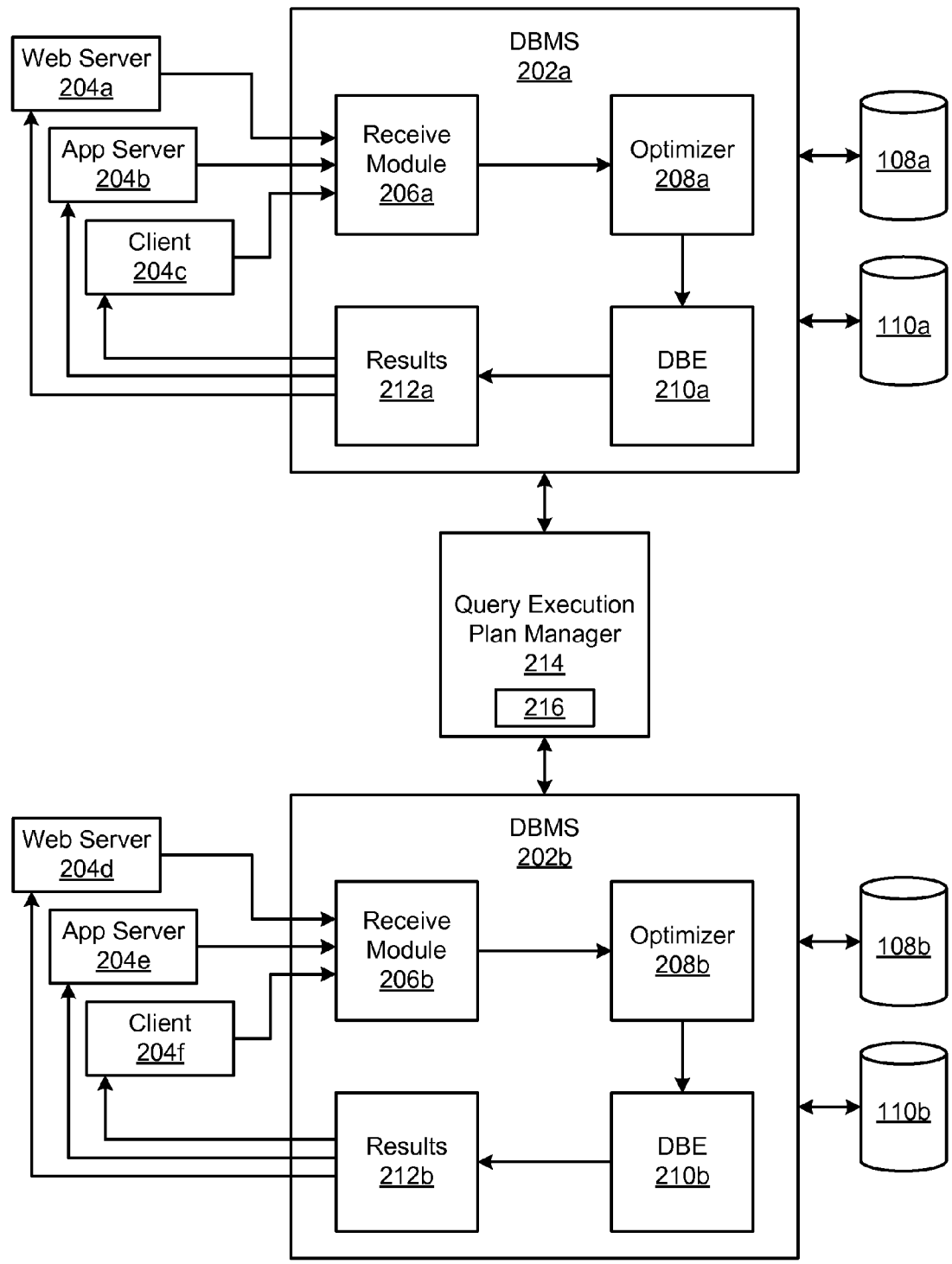
FIG. 3 is a schematic block diagram illustrating another embodiment of a system for automatic query execution plan and performance stabilization for workloads in accordance with the present invention.

FIG. 3 illustrates another embodiment of a system for managing query execution plans for a workload 216. In the pictured embodiment, the Query Execution Plan Manager 214 is operationally connected to two DBMSs 202a,b. In this embodiment, the Query Execution Plan Manager 214 may monitor a workload 216 that has queries directed to a plurality of DBMSs 202a,b or may monitor a plurality of workloads 216 across a plurality of DBMSs 202a,b. Furthermore, if an identical database statement is performing better on DBMS 202a as compared to DBMS 202b, the Query Execution Plan Manager 214 may propagate a hint for a QEP from one DBMS 202a to another DBMS 202b and compare other configuration parameter settings between the two DBMSs 202a,b. Although two DBMSs 202a,b are pictured in FIG. 3, in certain embodiments, more than two DBMSs 202a,b may be connected to the Query Execution Plan Manager 214.

Figure 4:
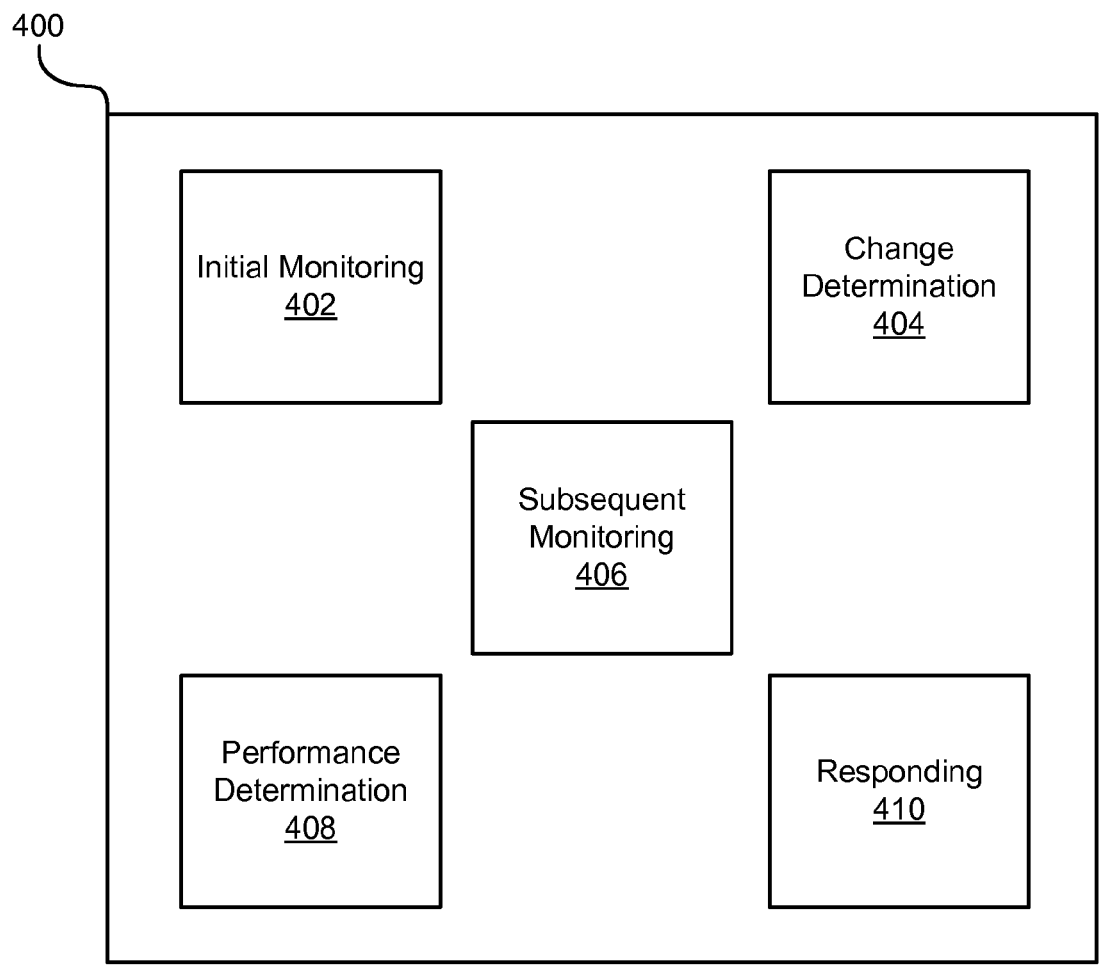
FIG. 4 is a schematic block diagram illustrating one embodiment of an apparatus for automatic query execution plan and performance stabilization for workloads in accordance with the present invention.

FIG. 4 illustrates one embodiment of an apparatus 400 for managing query execution plans for a workload 216. The apparatus 400 is one embodiment of the Query Execution Plan Manager 214. The apparatus in the pictured embodiment includes an initial monitoring module 402, a change determination module 404, a subsequent monitoring module 406, a performance determination module 408, and a responding module 410.

The initial monitoring module 402 gathers an initial set of performance characteristics generated from a DBMS 202 executing a database workload 216 according to one or more QEPs. The performance characteristics may include data such as execution times for a single database statement, a group of database statements, or execution times at the workload 216 level. In one embodiment, the execution time may be further broken down to include client side execution time, database (server side) execution time, and time associated with data travel on the network. The initial monitoring module 402 gathers performance characteristics such as execution time at multiple levels to give a DBA various perspectives on the data as explained below.

In certain embodiments, the performance characteristics include the state of the DBMS 202 during the execution such as table metadata information including table column statistics and database table index statistics. In one embodiment, the performance characteristics include a full system snapshot of the parameters and configuration of the DBMS 202. The initial monitoring module 402 may capture a system snapshot periodically at a predetermined interval or when an event in the DBMS 202 occurs. Furthermore, the initial monitoring module 402 may denote the QEPs associated with the workload 216 being monitored. The initial monitoring module 402, in one embodiment, gathers performance characteristics for both static and dynamic database statements.

In one embodiment, the initial monitoring module 402 also gathers QEP characteristics using pre-existing tools such as the "EXPLAIN" tool from the DB2 DBMS from International Business Machines ("IBM"). The Explain tool generates explain tables that store information on how a query was executed. The explain table has a tree-like representation starting with a top node and its subsequent children. For example, consider the following database statement:

select empno, firstnme, lastname, deptname
from employee, department
where employee.workdept=department.deptno During execution, the above statement is split into a table scan of the TABLE "department" and then a table scan of the TABLE "employee" and the results from both are JOINED using a HSJOIN with the equality predicate. The explain table will have the operators along with detailed data on each of the operators.

When read by the tool, this will give us a QEP along with supporting statistics for each of the nodes (operators). DB2 has the following explain tables storing different levels of detail:

EXPLAIN_STATEMENT—stores the statement details that have been explained

EXPLAIN_INSTANCE—similar to the above table

EXPLAIN_OBJECT—stores information on the objects that are used like in the example below, it would have details on the tables. if there is an index used, it will have details on the index (statistics information)

EXPLAIN_PREDICATE—information on the predicates used in the statement

The initial monitoring module 402 stores the information provided by the explain tables for QEP comparisons and fallback perspectives. This information provides the initial monitoring module 402 with details on the operators and data used at each step in the plan compilation by the DBMS and the associated supporting data. Other DBMSs besides DB2 provide similar information.

The initial monitoring module 402 may also use the pre-existing tool pureQuery from IBM to gather performance statistics related to the workload. The initial monitoring module 402 may obtain workload and query details from pureQuery such as package details, collection details, database statement execution times, and version identification.

The change determination module 404 determines a QEP change for one or more QEPs of the database workload 216. In one embodiment, the change determination module 404 determines a QEP change when the actual change occurs. In this embodiment, the change determination module 404 may detect an actual rebinding of a QEP to a database statement. The change determination module 404 may communicate with tools such as pureQuery to detect QEP changes of a workload 216. IBM's pureQuery allows information on a dynamic SQL workload 216 on the client-side driver layer to be captured and pureQuery converts the dynamic SQL workload 216 to static SQL statements. When pureQuery converts dynamic SQL statements to static SQL statements, the change determination module 404 may determine when a bind/rebind actually occurs and grab a new QEP if there is a new bind or a rebind.

In another embodiment, the change determination module 404 periodically monitors the DBMS 202 to determine QEP changes to the monitored workloads 216 soon after the changes occur. The change determination module 404 may read data from tables in the DBMS 202 with QEP information. For example, in DB2, when a bind/rebind command binds a database statement to a QEP, the bind/rebind command may set the "EXPLAIN" special option/parameter described above. Using the "EXPLAIN" parameter with the bind command, stores the QEP information in the EXPLAIN tables.

In one embodiment, the change determination module 404 stores a list for each database statement and the associated QEP. The change determination module 404 reads the QEPs from the EXPLAIN tables in the DBMS 202, compares these QEPs with the QEPs in the list, and detects differences as changes in the QEP. In one embodiment, the change determination module 404 also detects QEPs for database statements new to the workload 216, or database statements for which no QEP has been previously associated.

The subsequent monitoring module 406 gathers a subsequent set of performance characteristics generated from the DBMS 202 executing the one or more QEPs of the database workload 216 influenced by the QEP change. The performance characteristics gathered by the subsequent monitoring module 406 may be similar to the performance characteristics gathered by the initial monitoring module 402 for ease of comparison. As previously mentioned, these performance characteristics may include characteristics involving execution such as execution time, memory usage and the like. These performance characteristics may also include structural data of the database, index information, configuration information, and system snapshots. The performance characteristics may include statistics on the workload level, a subgroup within the workload 216, or the statement level.

The performance determination module 408 determines a performance difference created by the QEP change based on the initial set of performance characteristics and the subsequent set of performance characteristics. The performance difference, in one embodiment, is the difference between execution characteristics and may include such information as a difference in execution time for a single database statement with a changed QEP, or for the workload 216 for a plurality of database statements with changed QEPs. For example, if a database statement executed in five milliseconds with QEP "A" and the same statement executed in ten milliseconds with QEP "B", the performance difference would indicate that execution time took five more milliseconds under QEP "B."

The performance determination module 408, in one embodiment, consolidates statistics for a plurality of QEPs to give the DBA a view of performance differences at the workload level. Furthermore, at the workload level, the performance difference may indicate average execution time for the workload 216 after one or more QEP changes. In another embodiment, the performance difference also indicates differences in structural data of the database, index information, configuration information determined by the performance determination module 408 by comparing the initial set of performance characteristics and the subsequent set of performance characteristics. For example, the performance determination module 408 may compare two system snapshots and record differences in tables, indexes, and parameters as the performance difference.

In certain embodiments, the performance determination module 408 also determines the differences from the QEP before the change compared to the QEP after the change. The performance determination module 408 also determines the database statements in the workload 216 that underwent a QEP change. In addition, the change determination module 404 may also track changes in the configuration of the DBMS 202 executing the database workload 216. In one embodiment, the performance determination module 408 correlates QEP changes with performance behavior changes of the database statement execution to allow the DBA to decide if the plan change was for the worse or not.

The performance difference, in one embodiment, depends on the workload 216 that is being monitored. In addition, a DBA may define the criteria that the performance determination module 408 uses to determine a performance difference. In some embodiments, the DBA defines this criteria when the DBA creates a workload 216.

One of ordinary skill in the art realizes that performance determination module 408 may determine any difference that will aid the DBA in evaluating a workload 216 over the course of one or more QEP changes.

The responding module 410 responds to the performance difference in accordance with a monitoring policy. The monitoring policy, in one embodiment, is the action that the responding module 410 takes in response to the performance difference. The monitoring policy may be user-configurable. In addition, the monitoring policy may depend on the nature of the performance difference. Specifically, if the performance difference shows a performance degradation, the monitoring policy may direct that the responding module 410 take a specific action. Conversely, if the performance difference shows a performance improvement, the monitoring policy may direct that the responding module 410 take a different action. Furthermore, the monitoring policy may direct the responding module 410 to perform an automatic action or generate an alert and wait for the DBA to respond as will be described hereafter. In addition, the monitoring policy, in one embodiment, is workload 216 specific, related to the nature of the workload 216 such as the type of database statements in the workload 216, or defined by the DBA for the workload 216.

The monitoring policy may designate one or more thresholds related to performance or to the performance difference. The responding module 410 may determine an action based on the one or more thresholds specified in the monitoring policy. For example, if the performance difference is less than a particular value (A %), the monitoring policy may direct the responding module 410 to do nothing or execute a step such as log a QEP change in the repository for future analysis or generate a warning or notification.

If the performance difference is between two values such as within a range, "A %" and "B %", compared to previous execution of the workload 216, the monitoring policy may direct the responding module 410 to automatically revert to the QEP or QEPs and notify the DBA of the change as described below.

Figure 5:
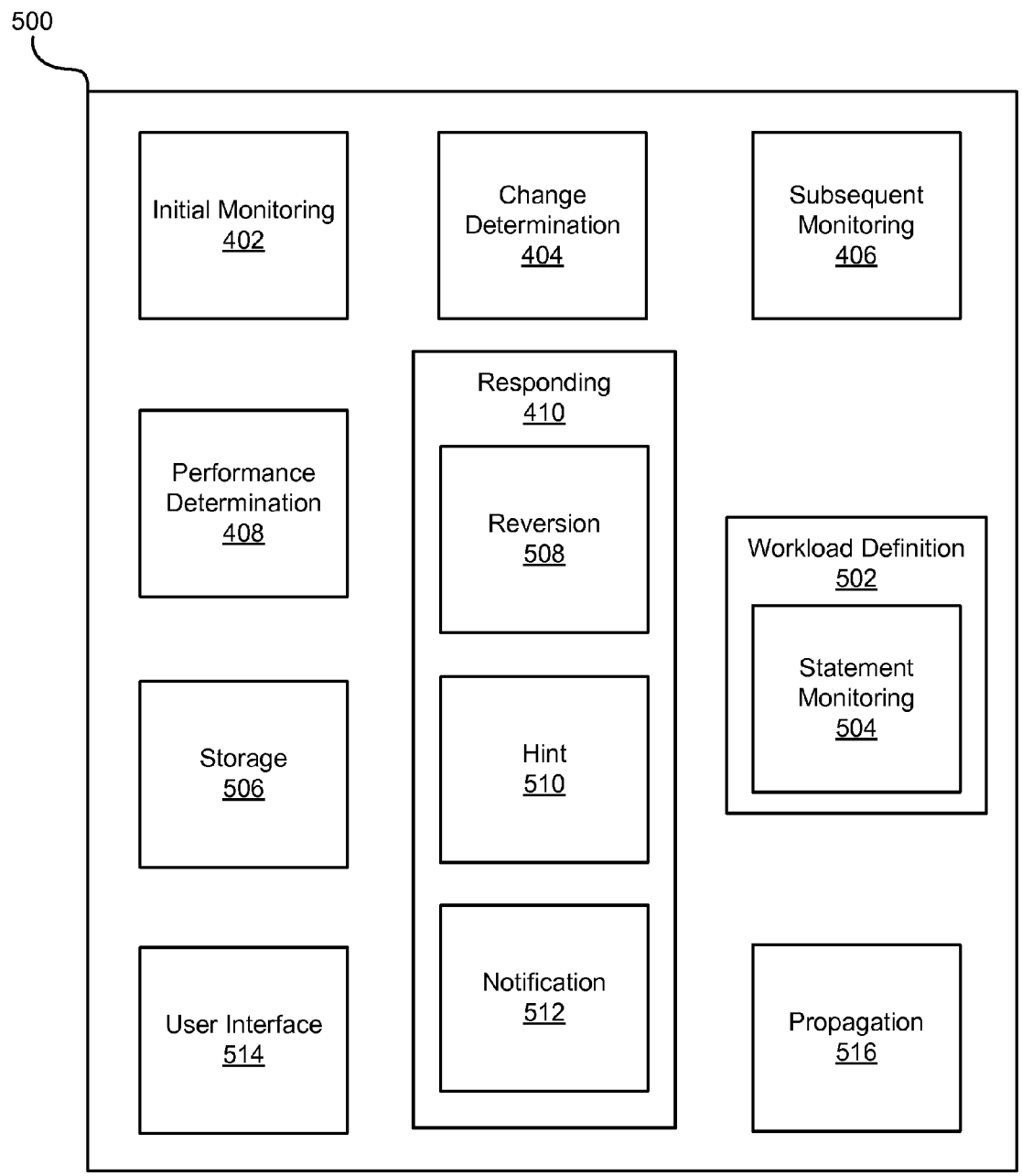
FIG. 5 is a detailed schematic block diagram illustrating one embodiment of an apparatus for automatic query execution plan and performance stabilization for workloads in accordance with the present invention.

If the performance difference is greater than B % (possibly due to other factors besides the QEP change), the monitoring policy may instruct the responding module 410 to notify the DBA of the QEP change and present the DBA with the QEP comparison and system snapshot details at the times of the QEP change. The DBA can perform the necessary analysis and revert to the initial QEP, create a new hint or perform other system configuration changes. Alternatively, the monitoring policy may direct the responding module 410 to notify the DBA of a QEP change and then the DBA can look at a report listing what has changed between the two timestamps and take actions on an "as-needed" basis. FIG. 5 illustrates another embodiment of an apparatus 500 for managing query execution plans for a workload 216. The apparatus 500 includes the initial monitoring module 402, the change determination module 404, the subsequent monitoring module 406, the performance determination module 408, and the responding module 410, which are substantially similar to those described above with relation to the apparatus in FIG. 4. Additionally, in one embodiment, the apparatus 500 includes a workload definition module 502, a storage module 506, a propagation module 516, and a user interface module 514. The workload definition module 502 may include a statement monitoring module 504, and the responding module 410 may include a reversion module 508 and a hint module 510.

The workload definition module 502 defines a set of database statements comprising the database workload 216. The workload definition module 502 may receive one or more user identified database statements from a user and define the set of database statements comprising the database workload 216 based on the one or more user identified database statements. For example, a DBA has a group of database statements that must meet certain performance criteria. The DBA selects the database statements from the database statements operating on the DBMS 202 and the workload definition module 502 defines a database workload 216 with these database statements. The DBA may select database statements for the workload 216 with a user interface or other form of user input.

In one embodiment, the workload definition module 502 allows a user to create, save, and edit a plurality of database workloads 216. For example, the DBA creates a database workload 216, selects several database statements for the workload 216, names the workload "Test," and saves the workload 216. The DBA may, at a later time, edit the database statements associated with the workload 216, rename the workload 216, delete the workload 216, or create a new workload 216.

In certain embodiments, a DBA may also define a monitoring policy and performance difference thresholds in relation to the workload 216. For example, the DBA may create a workload 216, select the database statements belonging to the workload 216, and specify what actions the responding module 410 should take according to different performance thresholds. In one embodiment, the workload definition module 502 allows a user to classify a workload 216. Each classification may have a monitoring policy profile and a performance difference threshold profile and these profiles include the monitoring policy and performance difference threshold configurations. The DBA may apply the default profile based on the classification or may modify the profile associated with the classification.

A DBA may classify a workload 216 according to the nature of the database queries in the statements. For example, if a particular workload 216 includes a high percentage of queries that update the database, the DBA may classify that workload 216 differently than a workload 216 with a high percentage of queries that read the database.

In one embodiment, the workload definition module 502 includes a statement monitoring module 504. The statement monitoring module 504 monitors one or more of an application, a session, and an Internet Protocol ("IP") address for one or more associated database statements. The workload definition module 502 may define the set of database statements comprising the database workload 216 based on the one or more associated database statements. The statement monitoring module 504 allows a DBA to monitor a set of application or session specific database statements. For example, a DBA wishes to pay particular attention to database statements associated with a crucial application. The statement monitoring module 504 monitors the DBMS 202 for database statements used by the application. The workload definition module 502 creates a workload 216 that includes these statements.

The storage module 506 stores the initial set of performance characteristics and the subsequent set of performance characteristics in a repository. Furthermore, the storage module 506 may also store the QEP change and the performance difference. In one embodiment, the storage module 506 stores the QEPs currently associated with database statements from the workload 216. The storage module 506 also may store QEPs of so far unknown database statements or database statements new to the workload 216. The storage module 506 may also store archived QEPs, or QEPs that were formerly associated with database statements in the workload 216. Therefore, the storage module 506 maintains a history of QEPs.

In certain embodiments, the storage module 506 stores a workload baseline complete with all QEPs, configurations, and index information of the workload 216 at the time the baseline is captured. The workload baseline may include the configuration of a single database statement, a group of database statements, or an entire workload 216. The storage module 506 may store workload baselines at predetermined intervals, or before significant changes in QEPs of the workload 216. In one embodiment, the DBA manually signals the storage module 506 to store a workload baseline. Beneficially, the workload baseline allows a DBA to preserve states of the workload 216 to aid in reaching optimal performance. If the QEP associated with one or more database statements changes and causes a performance decline, the DBA may return to a stored workload baseline that provided better performance.

The storage module 506 may also use existing tools such as pureQuery to store QEP versions and workload configurations. For example, the storage module 506 may create static packages for the monitored dynamic SQL workload 216. The static packages contain compiled SQL QEPs and thus represent a set of stabilized QEP versions. Using pureQuery, the storage module 506 may also create new versions of the static package with the same captured workload 216 at different points in time. This will result in multiple versions of QEPs.

The reversion module 508 signals the DBMS 202 to revert to a workload baseline in response to the performance difference exceeding a threshold. The workload baseline may be a certain performance level that the DBMS achieved historically with the workload 216. In another embodiment, the workload baseline is the QEPs associated with the database statements of the workload 216 at a certain point in time. Furthermore, the workload baseline may also include the system configuration settings and database indexes at a certain point in time.

In one embodiment, the reversion module 508 follows the monitoring policy in signaling the DBMS to revert to a workload baseline, a portion of a workload baseline, or to archived QEPs for selected statements. In one embodiment, the reversion module 508 automatically signals the DBMS 202 when the performance difference indicates a performance degradation. The reversion module 508 may signal the DBMS 202 to revert to pre-determined workload baseline, the most recent stored workload baseline, or the workload baseline that exhibited the best performance characteristics. In another embodiment, the reversion module 508 alerts a user when the performance difference exceeds the threshold and gives the user the opportunity to select a workload baseline to which the DBMS 202 will revert.

In one embodiment, the reversion module 508 signals the DBMS 202 to revert to a workload baseline by applying one or more hints to modify the QEPs of the current workload configuration to resemble those of the workload baseline. The reversion module 508 may automatically apply hints from the QEPs of the workload baseline to the current workload configuration. The reversion module 508 thereby frees the DBA from the burden of understanding and applying hints.

In one embodiment, the reversion module 508 may revert to previous workload baselines using static packages created by pureQuery. The reversion module 508 may leverage the same client-side layer that captured the workload 216 to reroute dynamic SQL requests to the appropriate sections in the static package (as the capture phase has recorded this information). The effect is that the dynamic SQL workload 216 issued by the application is in reality executed with stable QEPs without any change required to the application. The rerouting of dynamic SQL requests may be easily controlled by routing one version of a QEP to another one thereby providing fallback capabilities.

The hint module 510 applies a hint to the DBMS 202 to modify the one or more QEPs of the database workload 216 influenced by the QEP change. As previously mentioned, the hint module 510 may automatically apply a hint based on the QEP of a particular database statement with desired performance characteristics. In another embodiment, the hint is received by the user. In addition, the hint module 510 may guide the user in creating a hint. For example, the hint module 510 may suggest hints to the user based on other QEPs.

The hint module 510 may apply a hint to a single DBMS 202, or to two or more DBMSs 202 if the hint relates to a database statement running on more than one DBMS 202.

The notification module 512, in certain embodiments, generates a notification in response to the performance difference exceeding a threshold. In addition, the notification module 512 may allow a DBA to set a performance baseline. In this embodiment, the notification module 512 generates a notification to alert the DBA when performance varies from the baseline by a predetermined amount. The notification module 512 may send the notification by email, text message, with a page, or any other form of electronic communication known in the art. In one embodiment, the notification module 512 enters a record of a notification event in a log. The notification module 512 may also generate a message through a user interface as will be described hereafter.

In certain embodiments, the notification module 512 specifies the QEP changes along with the performance statistics related to the QEP change. For example, the user may click on an alert displayed on a user interface that will then show the user two versions of the QEP side by side with information on what has changed. In one embodiment, the notification module 512 lists the QEPs that changed, the performance difference for each database statement affected by the QEP change, and the overall performance difference for the entire workload 216. In another embodiment, the notification module 512 lists the QEPs that changed in addition to the details of what changed in each QEP.

In one embodiment, the notification module 512 generates a notification whenever a QEP change occurs or whenever the workload configuration changes from a workload baseline. The user may specify the level of detail of the notification, the performance difference at which to issue a notification, and the event that triggers the notification. For example, the user may want a notification if the performance difference indicates a performance improvement so that the user may determine what QEPs are the most efficient.

The notification module 512 may also offer recommendations on a course of action for the user. For example, the notification module 512 may recommend applying a hint from an archived QEP to a current QEP. In addition, the notification module 512 may also recommend that the user wait until further performance characteristics have been gathered before embarking on a course of action.

In one embodiment, the notification module 512 may notify a DBA regarding trends at the database statement or workload level. For example, the DBA may select the workload or statements for the notification module 512 to monitor. In addition, the DBA may select time periods from which the notification module 512 will determine trends. The DBA may configure the notification module 512 to notify the DBA of the trends at predetermined intervals, or to notify the DBA when the performance trends reach a certain threshold.

The user interface module 514 presents a user with two or more versions of a particular QEP through a user interface. The particular QEP may be a QEP changed by the QEP change. In addition, the user interface module 514 may indicate differences between the versions of the particular QEP. For example, the user interface module 514 may display a previous version of a QEP on one side of the screen and display the new version of the QEP after the change on the other side of the screen. Furthermore, the user interface module 514 may highlight the differences between the QEPs. The user interface module 514 may also indicate differences between system configurations by displaying changes in a system snapshot.

In one embodiment, the user interface module 514 allows a user to create a hint to apply to the DBMS 202. The user interface module 514 displays the necessary information to the user to guide the user in hint creation.

The user interface module 514, in one embodiment, allows a user to view stored information such as QEPs, performance characteristics, QEP changes, and the like. The user interface module 514 also may display this information for a single DBMS 202 or for a plurality of DBMSs 202.

In another embodiment, the user interface module 514 displays overall workload execution times, execution time spent on client side, the network side, and on the database. Furthermore, the user interface module 514 may also allow the DBA to "drill down" to any level in the statistics. For example, the DBA may be able to break down the database execution times from the workload level, to one or more subsets of the workload including groups of statements, individual statements, and portions of statements. Therefore, the DBA first sees that the workload execution time is larger, drills down to see that the database execution time is more, and can then drill farther down to look at the QEPs and compare them.

In certain embodiments, the user interface module 514 displays trends in database statement or workload performance. A DBA may view trends in performance over a selected time period for selected database statements or workloads.

The propagation module 516 propagates a hint to the current DBMS or to an additional DBMS 202. If a particular database statement in a workload 216 is targeted to run on different DBMSs 202 or in another location on the same DBMS, and the DBA wishes to apply the hint on every DBMS 202 that executes the particular statement, the propagation module 516 applies the hint on each DBMS 202 with the statement. If the same database statement is performing better on DBMS 202a as compared to DBMS 202b, the propagation module 516 may check if there is a hint applied on DBMS 202a and compare the other configuration parameter settings between the two DBMSs 202. If the hint has not been applied to DBMS 202b, the propagation module 516 may apply the hint on DBMS 202b.

Moreover, when the DBA applies a hint to a database statement on one DBMS 202a, the propagation module 516 may detect that the database statement is being used on another DBMS 202b and prompt the DBA to apply the hint to the other DBMS 202b also.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
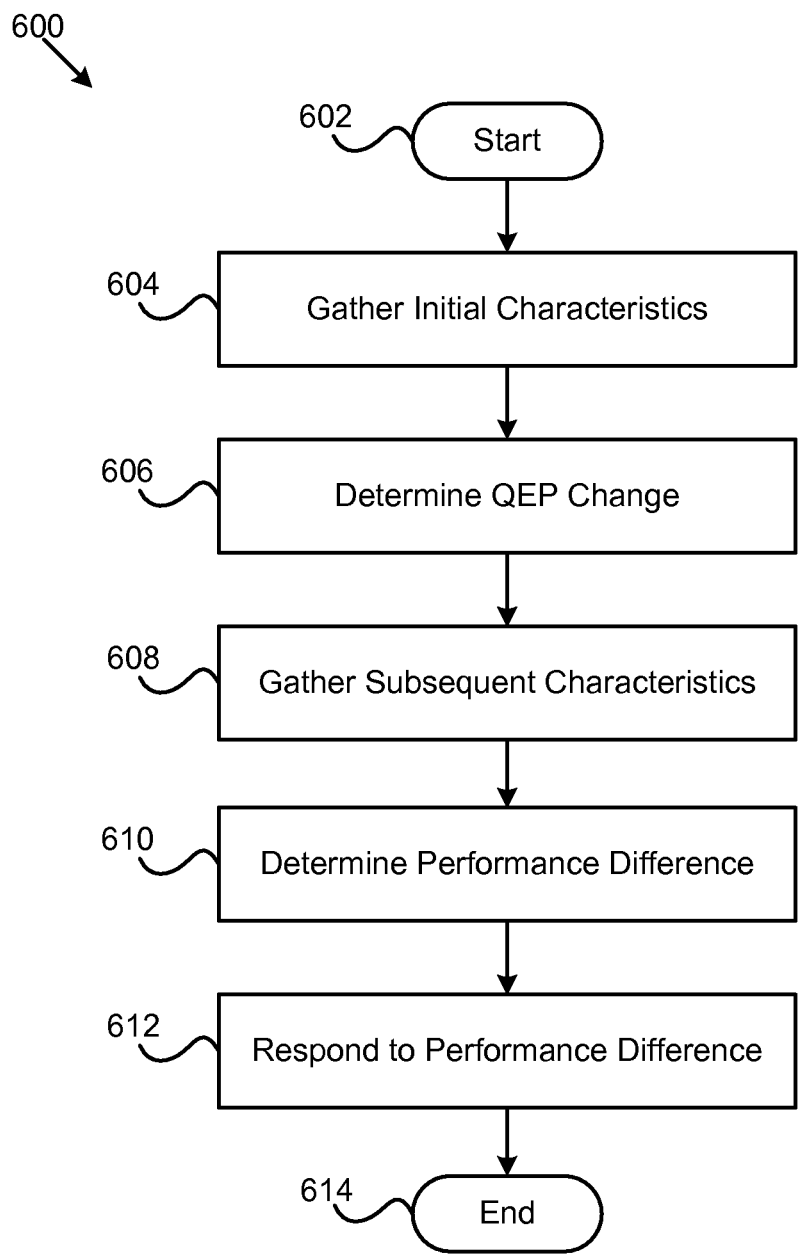
FIG. 6 is a schematic flow chart diagram illustrating one embodiment of a method for automatic query execution plan and performance stabilization for workloads in accordance with the present invention.

FIG. 6 illustrates one embodiment of a method 600 for managing query execution plans. The method 600 starts 602 when the initial monitoring module 402 gathers 604 an initial set of performance characteristics generated from a DBMS 202 executing a database workload 216 according to one or more QEPs. Then, the change determination module 404 determines 606 a QEP change for one or more QEPs of the database workload 216. Next, the subsequent monitoring module 406 gathers 608 a subsequent set of performance characteristics generated from the DBMS 202 executing the one or more QEPs of the database workload 216 influenced by the QEP change. The performance determination module 408 then determines 610 a performance difference created by the QEP change based on the initial set of performance characteristics and the subsequent set of performance characteristics. The responding module 410 responds 612 to the performance difference in accordance with a monitoring policy. Then, the method 600 ends 614.

Figure 7:
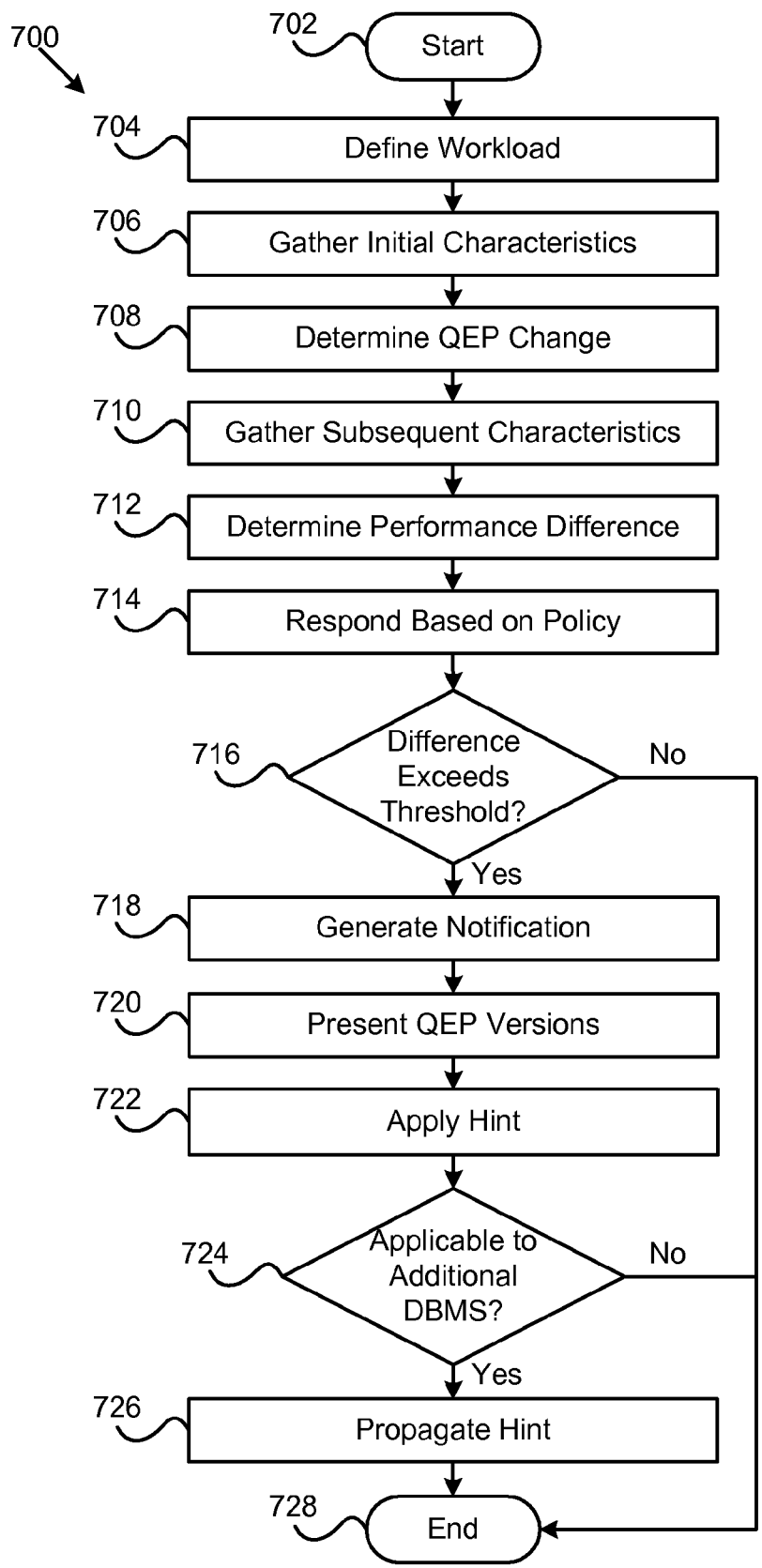
FIG. 7 is a detailed schematic flow chart diagram illustrating one embodiment of a method for automatic query execution plan and performance stabilization for workloads in accordance with the present invention.

FIG. 7 illustrates a detailed embodiment of a method 700 for managing query execution plans for a workload 216. The method 700 starts 702 when the workload definition module 502 defines 704 a set of database statements comprising the database workload 216. The set of database statements may be obtained by a user through the user interface module 514. In addition, the statement monitoring module 504 may obtain the set of database statements by monitoring an application, a session, or an IP address for associated database statements.

Next, the initial monitoring module 402 gathers 706 an initial set of performance characteristics generated from a DBMS 202 executing a database workload 216 according to one or more QEPs. The performance characteristics may include data such as execution times for a single database statement, a group of database statements, or execution times at the workload level. The performance characteristics may also include a full system snapshot of the parameters and configuration of the DBMS 202.

Next, the change determination module 404 determines 708 a QEP change for one or more QEPs of the database workload 216. The subsequent monitoring module 406 then gathers 710 a subsequent set of performance characteristics generated from the DBMS 202 executing the one or more QEPs of the database workload 216 influenced by the QEP change. The performance determination module 408 then determines 712 a performance difference created by the QEP change based on the initial set of performance characteristics and the subsequent set of performance characteristics. The responding module 410 then responds 714 to the performance difference according to a threshold specified by a monitoring policy. If the responding module 410 determines 716 that the performance difference does not exceed the threshold specified in the monitoring policy, the method 700 ends 728.

Alternatively, if the responding module 410 determines 716 that the performance difference exceeds the threshold specified in the monitoring policy, the notification module 512 generates 718 a notification to the user. For example, the notification module 512 may trigger a message on the user interface of the user interface module 514 that describes the QEP changes in the workload 216 and indicates that performance has declined by a certain amount. The user interface module 514 presents 720 the initial QEP (the QEP before the QEP change) and the subsequent QEP (the QEP after the QEP change) for each database statement in the workload 216 that has undergone a QEP change. The user interface module 514 highlights the differences in the QEP versions as well as differences in the configuration of the DBMS 202 through system snapshots.

The hint module 510 applies 722 one or more hints to the DBMS 202 to modify the QEPs of the database workload 216 influenced by the QEP change. The hint module 510 may receive the hint from the user through the user interface.

Alternatively, the hint module 510 may automatically generate the hint based on a QEP from an earlier workload baseline. The propagation module 516 then determines 724 that the database statements related to the hints are not running on other DBMS 202 and the method 700 ends 728. Alternatively, the propagation module 516 determines 724 that the database statements related to the hints are running on other DBMSs 202. The propagation module 516 then propagates 726 the hints to the other DBMSs 202 that are running the database statements related to the hints. Then, the method 700 ends 728.

One of ordinary skill in the art realizes that the steps of generating a notification, presenting QEP versions and applying the hint may vary in order or performance based on the monitoring policy. Furthermore, as described above, the monitoring policy may specify a plurality of threshold levels. The responding module 410 may respond based on the threshold level reached by the performance difference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing query execution plans (QEP) for a database workload, the method comprising:
   converting a dynamic Structured Query Language (SQL) workload to at least one static database statement of the database workload;
   in response to detecting a binding of a QEP to the at least one static database statement, determining a performance difference between an initial set of performance characteristics of the database workload prior to the binding of the QEP and a subsequent set of performance characteristics of the database workload created by the binding of the QEP; and
   responding to the performance difference in accordance with a monitoring policy.

2. The method of claim 1, further comprising defining the at least one static database statement comprising the database workload.

3. The method of claim 2, wherein defining comprises receiving one or more user identified database statements from a user and defining the at least one static database statement comprising the database workload based on the one or more user identified database statements.

4. The method of claim 2, wherein defining comprises monitoring one or more of an application, a session, and an Internet Protocol (IP) address for one or more associated database statements and defining the at least one static database statement comprising the database workload based on the one or more associated database statements.

5. The method of claim 1, further comprising storing one or more of the initial set of performance characteristics, the subsequent set of performance characteristics, the QEP change, the performance difference, and one or more QEPs of the database workload influenced by the binding of the QEP in a repository.

6. The method of claim 1, wherein responding comprises signaling a database management system (DBMS) to revert to a workload QEP baseline in response to the performance difference exceeding a threshold.

7. The method of claim 1, wherein responding comprises applying a hint to a database management system (DBMS) to modify one or more QEPs of the database workload influenced by the binding of the QEP.

8. The method of claim 7, further comprising receiving the hint from a user.

9. The method of claim 1, further comprising presenting a user with two or more versions of a particular QEP through a user interface, the particular QEP comprising a QEP changed by the binding of the QEP, the user interface configured to indicate differences between the versions of the particular QEP.

10. The method of claim 1, further comprising gathering one or more of the initial set of performance characteristics and the subsequent set of performance characteristics by gathering one or more of database table column statistics, database table index statistics, execution time, client side execution time, server side execution time, and a system snapshot.

11. An apparatus for managing query execution plans (QEP) for a database workload, the apparatus comprising:
a storage device storing executable code;
a processor executing the executable code, the executable code performing the operations of:
converting a dynamic Structured Query Language (SQL) workload to at least one static database statement of the database workload;
detecting a binding of a QEP to the at least one static database statement;
determining a performance difference between an initial set of performance characteristics of the database workload prior to the binding of the QEP and a subsequent set of performance characteristics of the database workload created by the binding of the QEP in response to detecting the binding of the QEP; and
responding to the performance difference in accordance with a monitoring policy.

12. The apparatus of claim 11, the operations further defining the at least one static database statement comprising the database workload, the database workload comprising a workload classification, the workload classification comprising a monitoring policy profile and a performance threshold profile.

13. The apparatus of claim 12, the operations further monitoring one or more of an application, a session, and an Internet Protocol ("IP") address for one or more associated database statements and the workload definition module defining the at least one static database statement comprising the database workload based on the one or more associated database statements.

14. The apparatus of claim 11, the operations further storing one or more of the initial set of performance characteristics, the subsequent set of performance characteristics, the QEP change, the performance difference, and one or more QEPs of the database workload influenced by the binding of the QEP in a repository.

15. The apparatus of claim 11, the operations further signaling a database management system (DBMS) to revert to a workload QEP baseline in response to the performance difference exceeding a threshold.

16. The apparatus of claim 11, the operations further applying a hint to a database management system (DBMS) to modify one or more QEPs of the database workload influenced by the binding of the QEP.

17. The apparatus of claim 16, wherein the hint is related to a particular database statement of the database workload, the operations propagating the hint to an additional DBMS, the additional DBMS configured to execute the particular database statement.

18. The apparatus of claim 11, the operations further generating a notification in response to the performance difference exceeding a threshold.

19. The apparatus of claim 11, the operations further presenting a user with two or more versions of a particular QEP through a user interface, the particular QEP comprising a QEP changed by the binding of the QEP, the user interface module further configured to indicate differences between the versions of the particular QEP.

20. A computer program product comprising a tangible storage device storing code executable to perform operations for managing query execution plans (QEP) for a database workload, the operations of the computer program product comprising:
converting a dynamic Structured Query Language (SQL) workload to at least one static database statement of the database workload;
in response to detecting a binding of a QEP to the at least one static database statement, determining a performance difference between an initial set of performance characteristics of the database workload prior to the binding of the QEP and a subsequent set of performance characteristics of the database workload created by the binding of the QEP; and
responding to the performance difference in accordance with a monitoring policy.

21. The computer program product of claim 20, further comprising defining the at least one static database statement comprising the database workload, the database workload further comprising a workload classification, the workload classification comprising a monitoring policy profile and a performance threshold profile.

22. The computer program product of claim 20, further comprising storing one or more of the initial set of performance characteristics, the subsequent set of performance characteristics, the binding of the QEP, the performance difference, and one or more QEPs of the database workload influenced by the binding of the QEP in a repository.

23. The computer program product of claim 20, wherein responding comprises reverting to a workload QEP baseline in response to the performance difference exceeding a threshold.

24. The computer program product of claim 20, wherein responding comprises receiving a hint to modify the one or more QEPs of the database workload influenced by the binding of the QEP.

25. A computer program product comprising a tangible storage device storing code executable to perform operations for managing query execution plans (QEP) for a database workload, the operations of the computer program product comprising:
converting a dynamic Structured Query Language (SQL) workload to at least one static database statement of the database workload;
in response to detecting a binding of a QEP to the at least one static database statement, determining a performance difference between an initial set of performance characteristics of the database workload prior to the binding of the QEP and a subsequent set of performance characteristics of the database workload created by the binding of the QEP;
storing one or more of the initial set of performance characteristics, the subsequent set of performance characteristics, the binding of the QEP, the performance difference, and one or more QEPs of the database workload influenced by the QEP change in a repository; and responding to the performance difference in accordance with a monitoring policy.

* * * * *